(12) United States Patent
Kwatra et al.

(10) Patent No.: US 7,254,726 B2
(45) Date of Patent: Aug. 7, 2007

(54) SYSTEM AND METHOD FOR MANAGING SYSTEM EVENTS BY CREATING VIRTUAL EVENTS IN AN INFORMATION HANDLING SYSTEM

(75) Inventors: Ajay Kwatra, Austin, TX (US); Benjamen G. Tyner, Denver, CO (US)

(73) Assignee: Dell Products L.P., Round Rock, TX (US)

( * ) Notice: Subject to any disclaimer, the term of this patent is extended or adjusted under 35 U.S.C. 154(b) by 232 days.

(21) Appl. No.: 10/704,724

(22) Filed: Nov. 10, 2003

(65) Prior Publication Data

US 2005/0102543 A1 May 12, 2005

(51) Int. Cl.
*G06F 1/32* (2006.01)
*G06F 1/26* (2006.01)

(52) U.S. Cl. ............... 713/320; 713/300; 713/323; 713/330; 713/1; 713/2; 713/100; 710/260; 710/261; 710/263; 710/268; 718/1; 718/104; 718/107; 711/6; 711/203

(58) Field of Classification Search ............... 713/300, 713/320, 323, 330; 710/260, 261, 263, 268; 718/1, 104, 107; 719/323, 324; 711/6, 203
See application file for complete search history.

(56) References Cited

U.S. PATENT DOCUMENTS

| | | | | |
|---|---|---|---|---|
| 5,708,819 | A | * | 1/1998 | Dunnihoo ............ 713/323 |
| 6,055,643 | A | | 4/2000 | Chaiken ............ 713/323 |
| 6,122,748 | A | * | 9/2000 | Hobson ............ 713/323 |
| 6,167,511 | A | | 12/2000 | Lewis ............ 713/2 |
| 6,219,742 | B1 | | 4/2001 | Stanley ............ 710/260 |
| 6,247,079 | B1 | * | 6/2001 | Papa et al. ............ 710/302 |
| 6,463,492 | B1 | | 10/2002 | Engfer et al. ............ 710/260 |
| 6,678,830 | B1 | * | 1/2004 | Mustafa et al. ............ 713/310 |
| 6,799,278 | B2 | * | 9/2004 | Khatri et al. ............ 713/300 |
| 6,920,581 | B2 | * | 7/2005 | Bigbee et al. ............ 714/10 |
| 6,988,155 | B2 | * | 1/2006 | Lary et al. ............ 710/260 |
| 7,051,137 | B2 | * | 5/2006 | Poisner ............ 710/260 |
| 2004/0205272 | A1 | * | 10/2004 | Armstrong et al. ............ 710/260 |

* cited by examiner

*Primary Examiner*—Rehana Perveen
*Assistant Examiner*—Nitin C. Patel
(74) *Attorney, Agent, or Firm*—Baker Botts L.L.P.

(57) ABSTRACT

In a computer system or information handling system, a virtual system event provides for the communication of the notification of a system events from the hardware of the computer system to the power and configuration management system of the computer system.

15 Claims, 3 Drawing Sheets

SYSTEM AND METHOD FOR MANAGING SYSTEM EVENTS BY CREATING VIRTUAL EVENTS IN AN INFORMATION HANDLING SYSTEM

TECHNICAL FIELD

The present disclosure relates generally to the field of computer or information systems, and, more particularly, to a system and method for managing system events in a computer system or information handling system.

BACKGROUND

As the value and use of information continues to increase, individuals and businesses continually seek additional ways to process and store information. One option available to users of information is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems, including computer systems, may be designed to conform with one or more industry specifications for managing power consumption in a computer system. One of those industry specifications is the Advanced Configuration and Power Interface (ACPI) specification. The ACPI specification establishes common interfaces and controls for managing power consumption and the configuration of a computer system and the devices of the computer system.

The ACPI specification includes a provision for two General-Purpose Event Register Blocks for tracking power events and configuration events in the computer system. For the purposes of this disclosure, power events and configuration events may be referred to generally as system events. Each of the General-Purpose Event Register Blocks includes two registers, an enable register and a status register. The registers are typically included in the chip set of the computer system. In one implementation, the registers may be included, for example, in the I/O Controller Hub (ICH) of the Intel Hub Architecture or as part of a separate embedded controller. Each register will include an input pin or inputs pins for providing an input to the register to signal various power events in the computer system. Each bit in the status of a General-Purpose Event Register Block corresponds to an enable bit that has the same bit position in the enable register of the General-Purpose Event Register Block. When an enable bit is set, a set status bit in the corresponding bit position in the status register will set a bit that initiates a system control interrupt (SCI). Thus, when a system event occurs—such as the insertion of a drive, or the activation of a keyboard or mouse—the status bit associated with the system event will be set. If a corresponding enable bit is set, a signal associated with the issuance of a system control interrupt is likewise set, thereby enabling the computer system to recognize and manage the system event.

A difficulty arises when more than one signal that is associated with multiple system events are grouped into a single input to the status register of a General-Purpose Event Register Block. In the architecture of many computer systems, the recognition of system events will be routed through a Super I/O device or another device that provides a communications controller for several devices and peripherals in the computer system, including the drive bays, keyboard, and mouse of the computer system. The Super I/O or integrated I/O controller is coupled to the General-Purpose Event Register Block, which may reside in the I/O Controller Hub or similar device of the computer system. The integrated I/O controller typically has a single output that is coupled to the status register of the General-Purpose Event Register Block. As an example of such an architecture, a drive bay, a keyboard, and a mouse may each be coupled to the Super I/O or integrated I/O controller of the computer system. Thus, in this example, a system event associated with either the drive bay, keyboard, or mouse of the computer system will result in the integrated I/O controller setting an input bit in the status register of the General-Purpose Event Register Block. Because only a single signal is transmitted from the controller, the General-Purpose Event must be shared among all of the power events, and the power and configuration management system is not able to identify for the operating system the source of the system event. Thus, the integrated I/O controller can identify only that a non-unique or generic power or configuration event has occurred in one of the devices that reports power events to the integrated I/O controller. Because of the difficulty of differentiating among multiple system events coupled to a single integrated I/O controller, the power and configuration management system and the operating system of the computer system cannot operate in a manner that depends upon the differentiation of these system events. As an example, because the operating system cannot differentiate between the activation of the keyboard and the activation of a mouse, a system control interrupt is issued whenever a keyboard or mouse is activate, regardless of the preferences of the power and configuration management system for separately managing keyboard or mouse activations in a low power state.

In addition, the use of a single signal from the integrated I/O controller to the General-Purpose Event Register Block prevents the power management system and the operating system from distinguishing between power events, such as a wake event caused by the activation of a device while the computer system is in a low power state, and a configuration event, such as a run-time event, like the hot-plugging of a device in the computer system. From the perspective of the power management system and the operating system, both power events and configuration events are indistinguishable and the same response, the issuance of a system control interrupt, is indiscriminately employed for both types of events. As just one example of the difficulties caused by this architecture, the enable bit of the General-Purpose Event Register Block will frequently be disabled during those periods when the computer system is not in a lower power state. Because the enable bit is not set during these periods, any run-time events that occur during the period that the computer system is awake will not be recognized by the computer system.

One solution for differentiating between system events in the power and configuration management system is to include a separate input to the I/O Controller Hub for each system event. This solution would involve an architecture in which a signal associated with each system event is coupled to an input pin of the I/O Controller Hub. One difficulty of this architecture is that the number of available input pins on the I/O Controller Hub is scarce and not limitless. Dedicating an input pin to each power event to be tracked by the power management system and the operating system may not be a resourceful or practical use of the available pins of the I/O Controller Hub.

SUMMARY

In accordance with the present disclosure, a system and method for managing system events in a power management system is disclosed. For those system events that are not uniquely associated with an input to the power management system, the BIOS of the computer system uniquely identifies each system event to an input of the power management system such that each power event is uniquely identified to the power management system.

One technical advantage of the system and method disclosed herein is a technique for uniquely identifying system events to the power and configuration management system of the computer system. Because of this technical advantage, each system event, including each power event and each configuration event, can be managed on an individual and unique basis by the power and configuration management system and the operating system of the computer system. The ability to discriminate between system events permits the power management system to customize the operation of the power and configuration management system for the computer system user or in response to the characteristics of the devices causing the power events.

Another technical advantage of the present disclosure is that the system and method disclosed herein accommodates the existence of a single shared input for multiple system events to a General-Purpose Event logic element in a computer system operating in accordance with the Advanced Configuration and Power Interface (ACPI) specification. The system and method disclosed herein distributes the notification of system events across the available bits of the registers of the General-Purpose Event register block, allowing the unique identification and handling of system events associated with devices and operations in the computer system.

Another technical advantage of the system and method of the present disclosure is that the system and method does not interfere with the ACPI specification or the hardware architecture of the computer system. Rather, the system and method works with the constructs and logic events established in the ACPI specification. Additional General-Purpose Event Register Blocks need not be defined in order to have control over individual system events in the computer system. The system and method disclosed herein takes advantage of the existing protocols and defined logical elements of the ACPI specification to enable the individual control of system events in the computer system. With respect to the hardware architecture of the computer system, because the existing logical constructs of the ACPI Specification are employed in the techniques disclosed herein, additional hardware, including additional pins on the I/O controller hub of the Super I/O controller, or like hardware, is not necessary.

Another technical advantage of the system and method disclosed herein is that the system and method provides the ability to distinguish between power events and configuration events in the computer system. Each individual power event and each individual configuration event can be identified uniquely as part of the power and configuration management system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a person computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

The present disclosure concerns and system and method for managing system events, including power events and configuration events, in a computer system. In those instances in which multiple system events are represented by a single signal to an input to the power and configuration management system, the system events are recognized and managed as virtual system events, allowing the power and configuration management system and the operating system of the computer system to discriminate between the system events of the computer system. By following the teachings of the present disclosure, the power and configuration management system and the operating system of the computer system are able to manage the system events and their consequences with greater precision as compared with known power and configuration management protocols.

Figure 1:
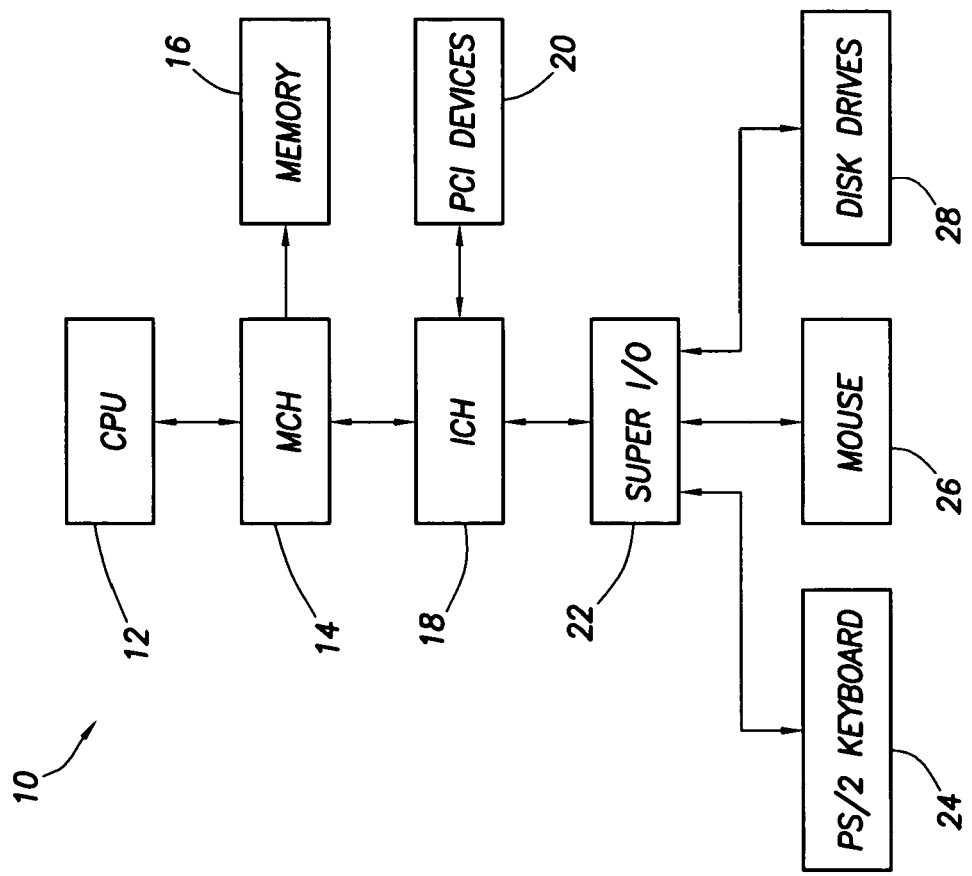
FIG. 1 is a diagram of the architecture of a computer system.

Shown in FIG. 1 is a diagram of the architecture of a computer system, including the bus and chip set architecture of the computer system. The computer system is indicated generally at 10. Computer system 10 includes a processor 12, which is coupled to a memory controller hub (MCH) 14. Memory controller hub 14 is coupled to memory 16 and an I/O Controller Hub (ICH) 18. I/O controller hub 18 may be coupled to one or more PCI devices 20. I/O controller hub 22 is coupled to a Super I/O controller 22, which is in turn coupled to a PS/2 keyboard 24, a mouse 26, and one or more disk drives or drives bays 28. It should be recognized that the architecture of the computer system 10 of FIG. 1 is an example of computer architecture and that the present invention may be employed in computer system with a computer architecture that differs from the architecture shown in FIG. 1.

Figure 2:
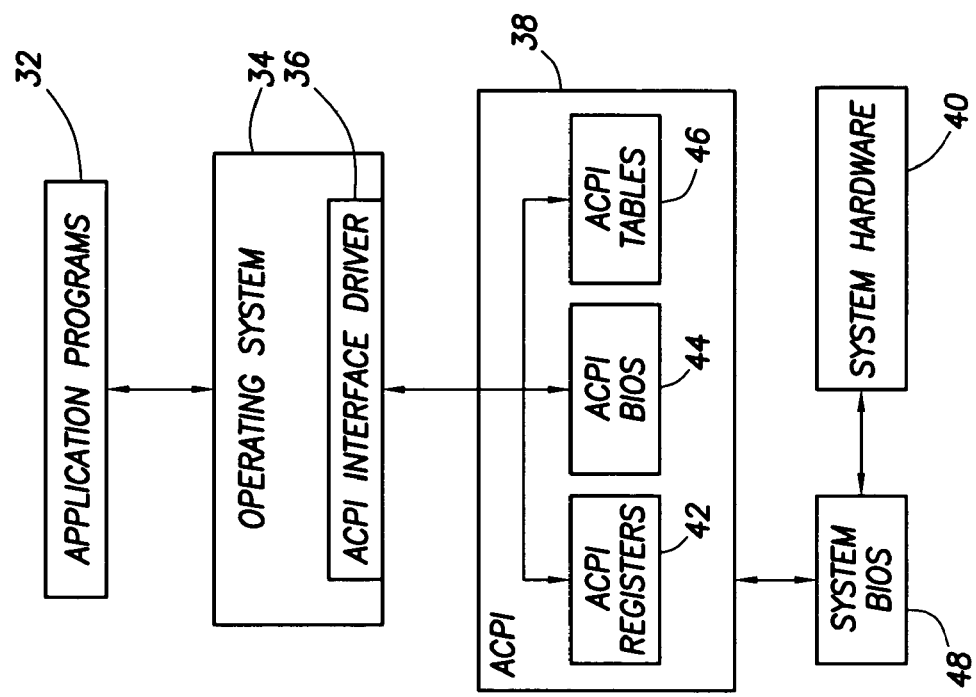
FIG. 2 a block diagram of the logical and communication relationship between hardware and software elements of the computer system of claim 1.

Shown in FIG. 2 is a block diagram of the logical and communication relationship between hardware and software elements of the computer system 10 of FIG. 1. Application programs communicate with and run on operating system 34. Operating system 34 includes an ACPI interface driver, which serves as an interface between the operating system of the computer system and the power management system of the computer system. The power management system is represented at 38 and includes ACPI registries 42, and ACPI BIOS 44, and ACPI tables 46, each of which communicates with ACPI Interface Driver 36 of operating system 34. Computer system 10 includes a system BIOS 48, which is operable to communicate with the system hardware 40 and the power management system 38 of the computer system.

The system BIOS 48 of the computer system is a set of software code that is resident in non-volatile storage space in the computer system. The system BIOS runs both at start-up and during the operation of the computer system. The system BIOS 48 is operable to recognize hardware events in the computer system and report those events to other software or hardware elements in the computer system. In the system and method of the present disclosure, the system BIOS 48 recognizes hardware events as reported to Super I/O controller 22 and is operable to set hardware elements in ICH 18 on the basis of those hardware events.

Figure 3:
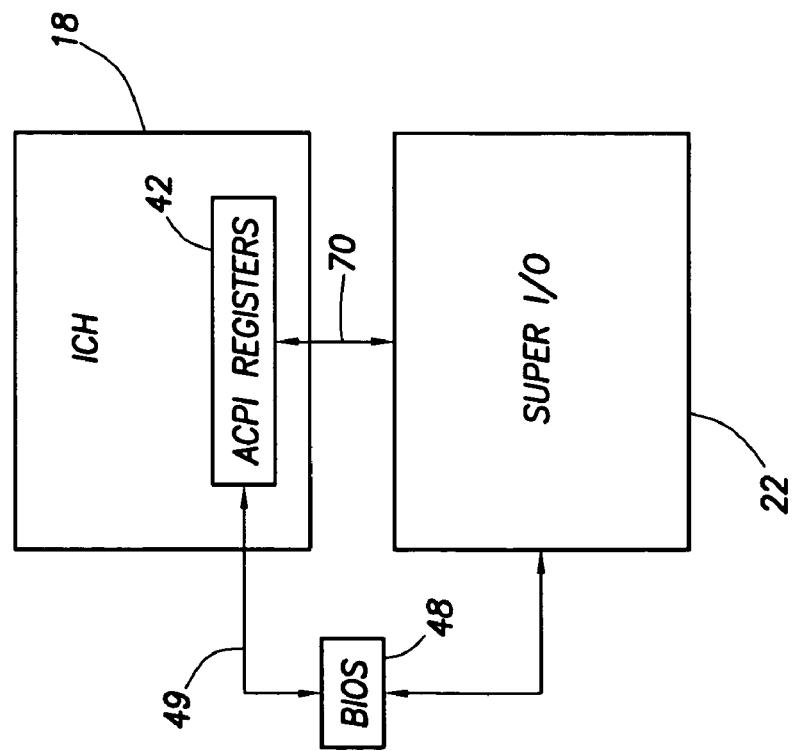
FIG. 3 is a diagram of the architecture of elements of a computer system.
Figure 4:
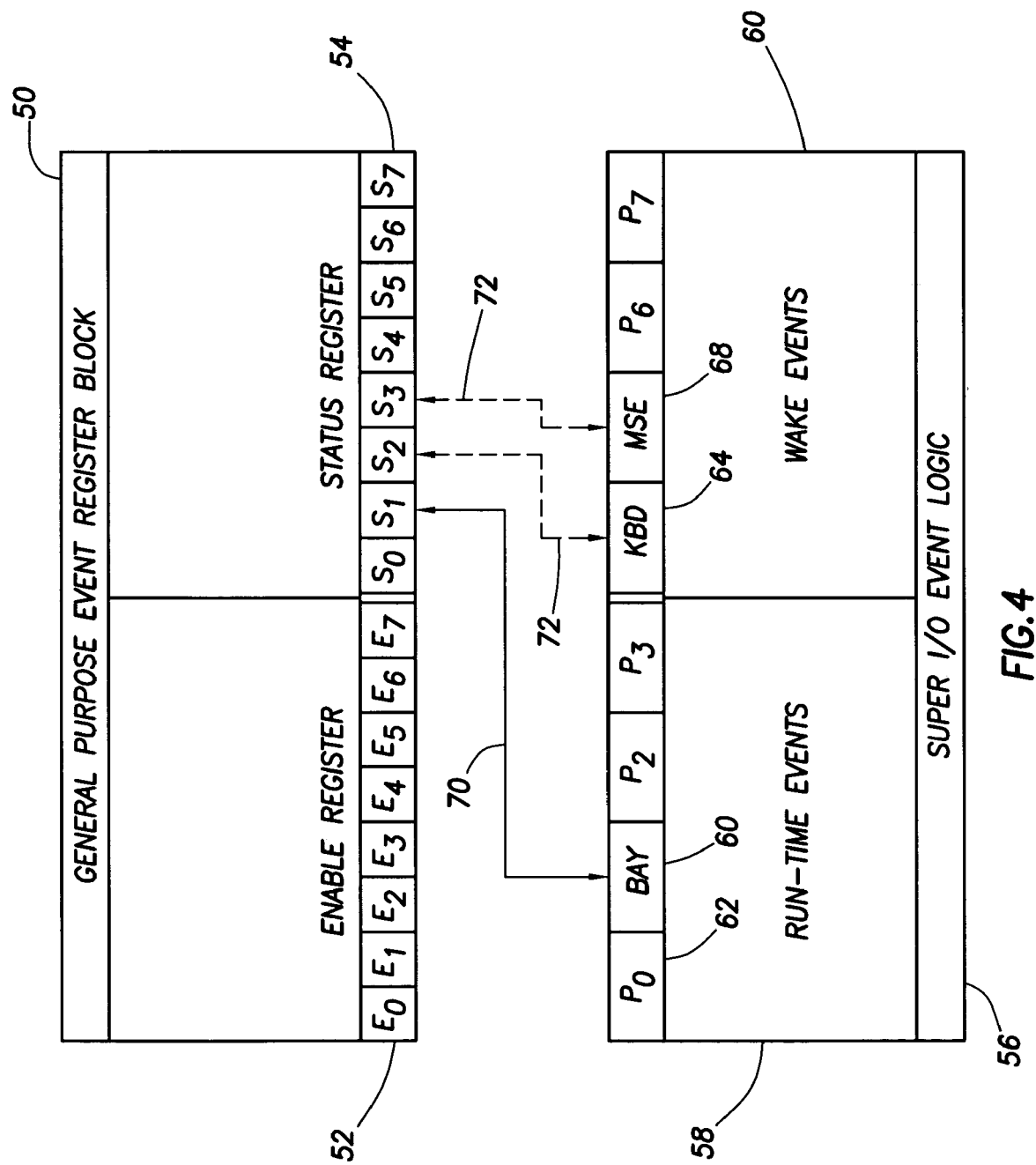
FIG. 4 is a diagram of the logical relationship between system event logic in the elements of a computer system.

The relationship between the system BIOS 38, Super I/O controller 22, and the ACPI registers 42 of ICH 18 are shown in FIG. 3. System BIOS 48 is operable to read and recognize inputs and register settings Super I/O controller 22 and, on the basis of those hardware events, set registers settings in the ACPI registers 42 of ICH 18. Shown in FIG. 4 is a diagram of the logical relationship between a General-Purpose Register Block 50 and the system event logic 56 of the Super I/O controller 22 of the present disclosure. As shown in FIG. 1, Super I/O controller 22 is coupled to and interacts with several peripheral devices in the computer system that can each generate a system event in the computer system that must be managed by the power and configuration management system of the computer system. With reference to FIG. 1, keyboard 24, mouse 26, and disk drives or drive bay 28 can each generate a system event. Keyboard 24 and mouse 26 are most often associated with wake or power events, which may cause the power and configuration management system to wake the computer system from a low power state. The disk drives or drive bay 28 are sometimes associated with run-time events, which are configuration events that occur during the operation of the computer system and that affect the configuration of the computer system. Event logic 56 within Super I/O controller 22 separates system events into run-time events 58, sometimes referred to as configuration events and which include events associated with disk drives or drive bay 28, and power or wake events 60, including events associated with keyboard 24 and mouse 26. Disk drive 28 is represented by logical element 60, and keyboard 24 and mouse 26 are represented, respectively, by logical elements 64 and 68. Logical element 62 is a placeholder that may be associated with other peripheral devices coupled to Super I/O controller 22. Logical element 62 is identified by $P_0$, and other placeholder logical elements are shown at $P_3$, $P_6$, and $P_7$ in the example of FIG. 4.

General-Purpose Register Block 50 includes a status register 54, having bits $S_0$-$S_7$, and an enable register 52, having bits $E_0$-$E_7$. Bay element 60 is coupled directly to bit $S_1$ of status register 54. If both bit $S_1$ and $E_1$ are set, a signal is sent from General-Purpose Register Block 50 to the remainder of the ACPI functionality 38 (shown in FIG. 1) to indicate that defined system event, in this case a run-time configuration event associated with disk drives or drive bay 28 has occurred. The ACPI power and configuration management system 38 in turn provides an indication of the system event to operating system 34 through ACPI interface driver 36. In contrast with the physical connection 72 between bay element 60 and bit $S_1$ of status register 54, a virtual connection 72 is in place between each of keyboard element 64 and mouse 68 and status register 54. The virtual connection is provided by system BIOS 48. Physical connection 70 of FIG. 4 is likewise shown in FIG. 3. The virtual and logical connection 72 between Super I/O controller 22 status register 54 occurs across the physical connection 49 between the system BIOS 48 and the ACPI registers 42 of ICH 18. ACPI registers 42 includes the status register 54 and the enable register 52 of the General-Purpose Event Block 50.

System BIOS 48 recognizes when keyboard element 64 our mouse element 68 goes positive. When this occurs, system BIOS 48 sets bit of status 54 that is associated with the logic element that has gone positive. In the example of FIG. 4, the occurrence of a power or wake event at keyboard 24 would cause logic element 64 to be set. System BIOS 48 recognizes that logic element 64 has been set and sets the bit of status register 54 that is associated with the logic element 64. In this example, bit $S_2$ is associated with logic element 64. System BIOS 48 maintains a table of associations between logic elements in the event logic of the Super I/O controller and the associated bit of the status register of the General-Purpose Event Register Block. According to this method, two additional virtual General-Purpose Events have been established in the power management and configuration system of the computer system. These events are described as virtual events in that these events are passed to the power management system through the system BIOS and outside of the power management and configuration specification. The system BIOS of the computer system serves as a conduit to establish two additional General-Purpose Events in the computer system, one associated with power events at the keyboard and another associated with power events at the mouse. Because each of the system events identified at the Super I/O controller is uniquely associated with an input to the power and configuration management system, the power and configuration management system may control the system events in the computer system with a greater level of precision with respect to reacting to power or configuration events in the computer system.

Figure 5:
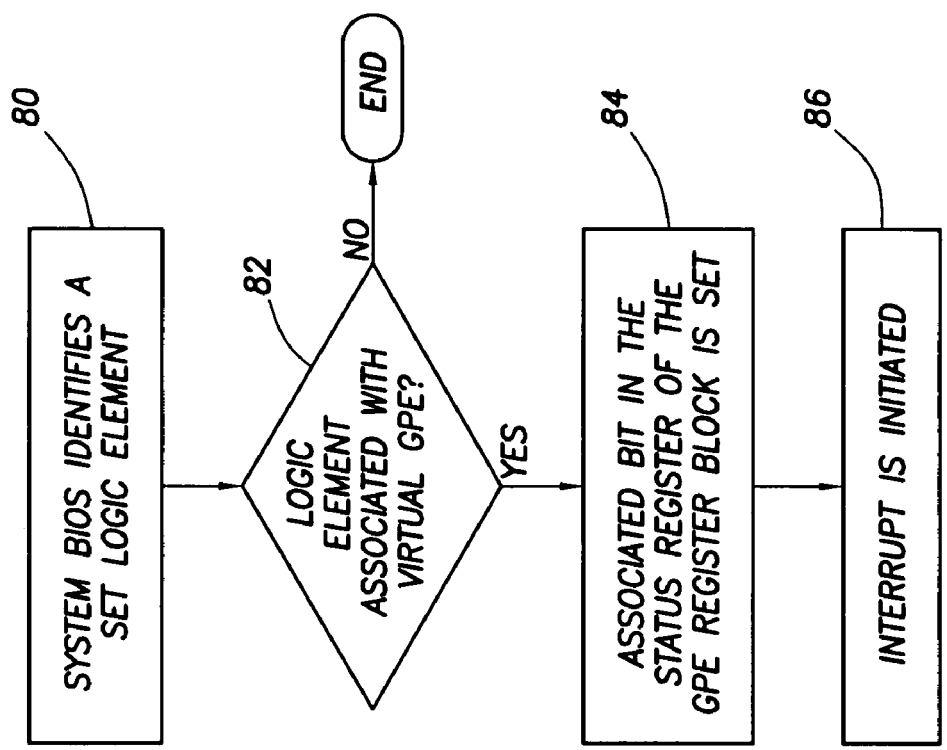
FIG. 5 is a flow diagram of the steps for communicating system events.

A flow diagram of a series of method steps for communicating system events to the ACPI system as part of a virtual General-Purpose Event is shown in FIG. 5. At step 80, the system BIOS 48 identifies that a logic element associated with a system event has been set in the Super I/O controller. In step 82, the system BIOS determines if the logic element is the subject of a virtual General-Purpose Event. If the logic element is not the subject of a virtual General-Purpose Event, the flow diagram concludes. If the logic element is the subject of a virtual General-Purpose Event, the system BIOS at step 84 sets the bit of the status register of the General-Purpose Register Block that is associated with the system event identified at the Super I/O Controller. The power and configuration management system next performs a logic function to act on the setting of the bit in the status register. This logic function is initiated by the BIOS system, which at step 86 initiates either a system control interrupt or a system management interrupt, both of which result in a resetting of the power and configuration management system and the execution of the logic function associated with the status register and enable register of the General-Purpose Event Register Block.

The methodology disclosed herein results, in the case of a system event in the computer system, in the setting a bit in the status register of the General-Purpose Event Register Block that is uniquely associated with the system event, allowing the power and configuration management system and the operating system to conduct operations that are uniquely dependent upon the specific system event associated with the bit of the status register. The power and configuration management technique disclosed herein permits system events to be disabled or enabled independently. The system disclosed herein comports with the requirements of the ACPI specification, including the use of a single General-Purpose Event Register Block construct of the ACPI specification, while also allowing differentiation among system events in the computer system. The technique disclosed herein permits multiple devices, producing both configuration events and power events, to be coupled to a single I/O controller in a computer system, while permitting the discrimination between configuration events and power events despite the existence of a single shared signal between the I/O controller and the power and configuration management system. The system disclosed herein also permits the virtual General-Purpose Events to coexist with General-Purpose Events that are explicitly defined through the ACPI specification.

It should be recognized that although the present disclosure has been described with reference to the Advanced Configuration and Power Interface specification, the system and method disclosed herein can be applied to any power and configuration management system as a tool for the management of system events in a computer system or information handling system. It should also be recognized that the methods disclosed herein are not limited in their application to the specific computer system architecture disclosed herein. Rather, the methods of the present disclosure may be applied to any computer system architecture in which it is desirable to manage the power events or configuration events of the computer system. Likewise, the system and method disclosed herein is not limited to the use of a Super I/O controller as an input device for recognizing system events and communicating those events to other components of the computer system. In addition, it should be recognized that, although the system and method disclosed herein is described with reference to system events associated with the keyboard, mouse, and drive bays of the computer systems, the system and method disclosed herein are equally applicable to the management of other system events in the computer system. Although the present disclosure has been described in detail, it should be understood that various changes, substitutions, and alterations can be made hereto without departing from the spirit and the scope of the invention as defined by the appended claims.

What is claimed is:

1. A computer system, comprising:
a processor;
a first device having memory associated with the power and configuration management system of the computer system;
a second device operable to identify system events to the first device; and
a system BIOS (basic input/output system) operable to set a memory element in the memory of the first device in response to a system event identified in the second device, whereby the system events identified by the second device is uniquely identified to the power and configuration management system through the location of the memory element in the memory of the first device, wherein the setting of the memory element in the memory of the first device is accomplished through a virtual system event through which system events identified by the second device are uniquely identified to the power and configuration management system through the location of the memory element in the memory of the first device.

2. The computer system of claim 1, wherein the power and configuration management system is the Advanced Configuration and Power Interface.

3. The computer system of claim 2, wherein the memory associated with the power and configuration management system and stored in the first device is a General-Purpose Event Register Block.

4. The computer system of claim 3, wherein the first device is an I/O (input/output) controller hub.

5. The computer system of claim 3, wherein the system BIOS is operable to identify a system event identified by the second device and, in response, set a bit in the status register of the General-Purpose Event Register Block in the I/O controller hub.

6. The computer system of claim 5, wherein each system event identifiable in the second device is uniquely associated with a bit in the status register of the General-Purpose Event Register Block in the I/O controller hub.

7. A method for managing system events in a computer system that includes a power and configuration management system that includes a memory location for receiving a notification of a system event in the computer system, comprising the steps of:
identifying at a controller in a computer system that a device in the computer system has reported a system event, wherein the controller is operable to receive reports of system events from multiple devices in the computer system and report on a shared basis to the memory location that a system event in a device of the computer system has occurred;
identifying a memory space in the memory location that is uniquely associated with the system event reported to the controller; and
setting the memory space in the memory location that is uniquely associated with the system event reported to the controller, wherein the memory space is set through the virtual handling of system events reported to the controller;

wherein the steps of the method are controlled by a system BIOS (basic input/output system).

8. The method for managing system events in a computer system of claim 7, further comprising the step of setting an interrupt in the computer system to cause a reset of the power and configuration management system following the step of setting the memory space in the memory location that is uniquely associated with the system event reported to the controller.

9. The method for managing system events in a computer system of claim 8, wherein the controller is operable to receive system events that comprise power events and configuration events.

10. The method for managing system events in a computer system of claim 8, wherein the power and configuration management system functions according to the Advanced Configuration and Power Interface specification.

11. The method for managing system events in a computer system of claim 10, wherein the memory location for receiving a notification of a system event in the computer system comprises a General-Purpose Event Register Block.

12. The method for managing system events in a computer system of claim 11, wherein the memory space comprise a bit in the status register of the General-Purpose Event Register Block.

13. An information handling system, comprising:
a processor;
a memory associate with a power and configuration management system;
a controller operable to receive reports of system events in devices coupled to the controller; and
a system BIOS (basic input/output system), wherein the system BIOS is operable to identify system events reported to the controller through a virtual event and set an indicator in memory, wherein the indicator in memory is uniquely associated with the system event.

14. The information handling system of claim 13, wherein the power and configuration management system functions according to the Advanced Configuration and Power Interface specification.

15. The information handling system of claim 13, wherein the system events comprise power events and configuration events.

* * * * *